United States Patent
Iriguchi et al.

(10) Patent No.: US 9,487,241 B2
(45) Date of Patent: Nov. 8, 2016

(54) CENTER CONSOLE STRUCTURE OF VEHICLE

(71) Applicant: MAZDA MOTOR CORPORATION, Hiroshima (JP)

(72) Inventors: Masahiro Iriguchi, Hiroshima (JP); Tatsunori Iwahara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/760,703

(22) PCT Filed: Nov. 6, 2014

(86) PCT No.: PCT/JP2014/079491
§ 371 (c)(1),
(2) Date: Jul. 13, 2015

(87) PCT Pub. No.: WO2015/072393
PCT Pub. Date: May 21, 2015

(65) Prior Publication Data
US 2015/0353142 A1    Dec. 10, 2015

(30) Foreign Application Priority Data

Nov. 15, 2013    (JP) .................................. 2013-236451

(51) Int. Cl.
*B60N 2/46*    (2006.01)
*B62D 25/14*    (2006.01)
(Continued)

(52) U.S. Cl.
CPC .............. *B62D 25/14* (2013.01); *B60K 37/06* (2013.01); *B60N 2/46* (2013.01); *B60N 2/4686* (2013.01); *B60N 3/102* (2013.01); *B60R 7/04* (2013.01); *B60T 7/10* (2013.01)

(58) Field of Classification Search
CPC ...... B60N 2/468; B60N 2/4686; B60N 2/46; B60R 7/04; B60K 37/02; B60K 37/04; B60K 37/06
USPC ............... 180/90; 296/37.12, 37.15, 37.8, 70
See application file for complete search history.

(56) References Cited

U.S. PATENT DOCUMENTS

| | | | | |
|---|---|---|---|---|
| 6,564,661 B2 * | 5/2003 | DeJonge | ................ | B60K 37/06 74/335 |
| 6,746,067 B2 * | 6/2004 | Schmidt | ................ | B60K 37/06 180/326 |

(Continued)

FOREIGN PATENT DOCUMENTS

| CN | 102529778 A | 7/2012 |
|---|---|---|
| CN | 102667676 A | 9/2012 |

(Continued)

OTHER PUBLICATIONS

International Search Report; PCT/JP2014/079491; Jan. 20, 2015.
(Continued)

*Primary Examiner* — James English
(74) *Attorney, Agent, or Firm* — Studebaker & Brackett PC (57) ABSTRACT

A pair of left and right pads (40) extending in a front-rear direction are provided on opposite side edges of a console main body (4). Each of the pads (40) has a width, in plan view, wider in its rear part than in its front part, and a top surface of a rear end of the pad (40) is substantially flush with a top surface of a front end of an armrest (8). A recessed surface (41) is formed on a top surface of the console main body (4) between the pair of left and right pads (40), and a dial switch (20) is disposed on the recessed surface (41). An elevated portion (7) having a top surface higher than the recessed surface (41) and lower than respective top surfaces of the pads (40) is formed behind the dial switch (20) and in front of the armrest (8).

20 Claims, 9 Drawing Sheets

(51) Int. Cl.
  *B60T 7/10* (2006.01)
  *B60N 3/10* (2006.01)
  *B60R 7/04* (2006.01)
  *B60K 37/06* (2006.01)

(56) References Cited

U.S. PATENT DOCUMENTS

| | | | | |
|---|---|---|---|---|
| 7,654,680 | B2* | 2/2010 | Kukucka | B60N 3/101 |
| | | | | 362/471 |
| 8,960,361 | B2* | 2/2015 | Helot | B60K 20/02 |
| | | | | 180/326 |
| 9,140,353 | B2* | 9/2015 | Meyer | B60K 37/06 |
| 2002/0196139 | A1* | 12/2002 | Nagasaka | B60K 37/06 |
| | | | | 340/456 |
| 2006/0022478 | A1* | 2/2006 | DeLong | B60N 2/468 |
| | | | | 296/37.8 |
| 2006/0214450 | A1 | 9/2006 | Sakakibara | |
| 2007/0018493 | A1* | 1/2007 | Kawachi | B60K 37/06 |
| | | | | 297/411.37 |
| 2008/0315606 | A1* | 12/2008 | Sturt | B60N 2/468 |
| | | | | 296/24.34 |
| 2010/0045060 | A1* | 2/2010 | Hipshier | B60N 2/4686 |
| | | | | 296/24.34 |
| 2010/0066115 | A1 | 3/2010 | Hipshier et al. | |
| 2011/0121596 | A1* | 5/2011 | Beyer | B60N 2/468 |
| | | | | 296/24.34 |
| 2011/0138322 | A1* | 6/2011 | Aoki | B60K 35/00 |
| | | | | 715/786 |
| 2013/0113726 | A1 | 5/2013 | Tovar et al. | |

FOREIGN PATENT DOCUMENTS

| | | |
|---|---|---|
| DE | 102009008727 A1 | 11/2009 |
| DE | 102010048515 A1 | 4/2012 |
| EP | 2465732 A1 | 6/2012 |
| JP | 2006-264550 A | 10/2006 |
| JP | 2010-515611 A | 5/2010 |
| JP | 2011-246006 A | 12/2011 |
| KR | 10-2012-0070928 A | 7/2012 |

OTHER PUBLICATIONS

The First Office Action issued by the Chinese Patent Office on May 5, 2016, which corresponds to Chinese Patent Application No. 201480003490.9 and is related to U.S. Appl. No. 14/760,703, with English language summary.

* cited by examiner

CENTER CONSOLE STRUCTURE OF VEHICLE

TECHNICAL FIELD

The present invention relates to a center console structure of a vehicle.

BACKGROUND ART

It is common to dispose, in a vehicle such as automobile, an armrest on a rear part of a console main body (center console) extending in a front-rear direction of the vehicle. Further, it is also common to configure the armrest to be slidable in the front-rear direction in order to secure an armrest function while permitting variation in physiques of occupants.

Patent Literature 1 discloses forming a pad having a longer dimension in a front-rear direction on each of left and right edges of a console main body to utilize the pads as an armrest. A container is formed between the pair of left and right pads, a top surface (lid) of the container being lower than the pads. Each of the pair of left and right pads has a substantially uniform width in the front-rear direction.

On the other hand, recently in many cases, various switches adapted to operate vehicle-mounted devices are disposed on a top surface of a console main body at a position in front of an armrest in a vehicle. As an example of the switches for operating the vehicle-mounted devices, Patent Literature 2 discloses providing an upwardly-projecting dial switch on a top surface of a console main body. These days, an increasing number of vehicles include such dial switch, which is rotated to operate, for example, a screen of a display provided in an instrument panel.

By the way, in the case where a dial switch is provided on a top surface of a console main body at a position in front of an armrest, it is important to sufficiently secure the operability of the dial switch because the dial switch is considered to be used at a high frequency. In particular, it is favorable for an occupant to operate the dial switch using his/her fingers with his/her arm (elbow) being placed on the armrest so that he/she can easily operate the dial switch. On the other hand, the armrest is desired to have a function that can overcome variation in physiques of occupants. In short, it is desirable to secure an armrest function that can overcome variation in physiques of occupants and secure the operability of the dial switch simultaneously.

The disclosure of Patent Literature 1 is satisfactory in the respect that the pair of left and right pads functioning as an armrest extend in the front-rear direction, so that an armrest function is secured irrespective of variation in physiques of occupants. However, each of the pads needs to have a large width (length in a vehicle width direction) in order to sufficiently secure the armrest function. This means that the width of the top surface of the console main body between the pair of left and right pads are made small, which makes it difficult to secure a sufficient installation space for switches such as a dial switch, a container, and the like. It can be considered to configure the armrest to be slidable in order to overcome variation in physiques of occupants. However, in this case, the structure is complicated and it is necessary to adjust the position of the armrest by sliding it according to a physique, which is therefore unfavorable.

CITATION LIST

Patent Literature

Patent Literature 1: Japanese Unexamined Patent Publication No. 2010-515611

Patent Literature 2: Japanese Unexamined Patent Publication No. 2011-246006

SUMMARY OF INVENTION

The present invention has been made in view of the above-mentioned problems and has an object of providing a center console structure of a vehicle, capable of satisfactorily securing an installation space for switches and the like on a top surface of a console main body and improving the operability of a dial switch simultaneously, while realizing a component that functions as an armrest irrespective of variation in physiques of occupants without using any movable mechanism.

In order to achieve the above-mentioned object, a center console structure of a vehicle according to the present invention comprises: a console main body disposed in a vehicle interior and extending in a front-rear direction of the vehicle; an armrest disposed on a rear end of the console main body; a dial switch adapted to operate a vehicle-mounted electronic device and disposed on a top surface of the console main body at a position in front of the armrest; a pair of left and right pads disposed in front of the armrest and extending in the front-rear direction along opposite side edges of the console main body, each of the pads having, in plan view, a width increasing from front to rear inwardly of the console main body, and a top surface of a rear end of each of the pads being substantially flush with a top surface of a front end of the armrest; a recessed surface formed on a top surface of the console main body between the pair of left and right pads, the recessed surface having a height lower than respective top surfaces of the pads, and the dial switch being disposed on the recessed surface to project upward; and an elevated portion located behind the dial switch and in front of the armrest, the elevated portion having a top surface higher than the recessed surface and lower than the pads, and being usable as a palm rest.

According to the present invention, it is possible to secure a sufficient installation space for switches and the like on a top surface of a console main body and, furthermore, to improve the operability of a dial switch, while realizing a component that functions as an armrest irrespective of variation in physiques of occupants without using any movable mechanism.

DESCRIPTION OF EMBODIMENTS

Figure 1:
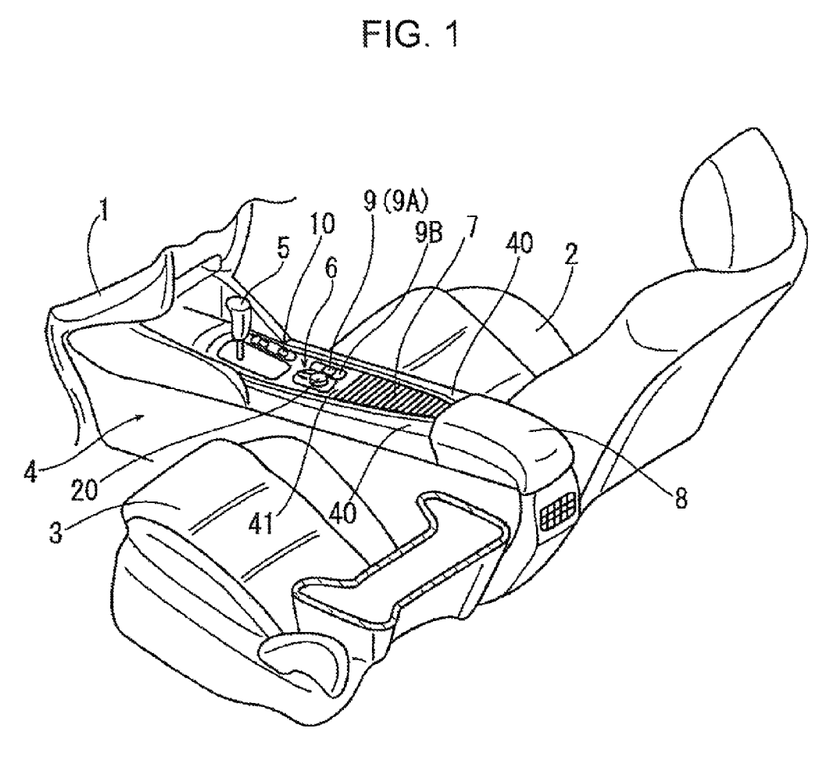
FIG. 1 is a perspective view showing an essential part of a center console and its surroundings according to an embodiment of the present invention.
Figure 2:
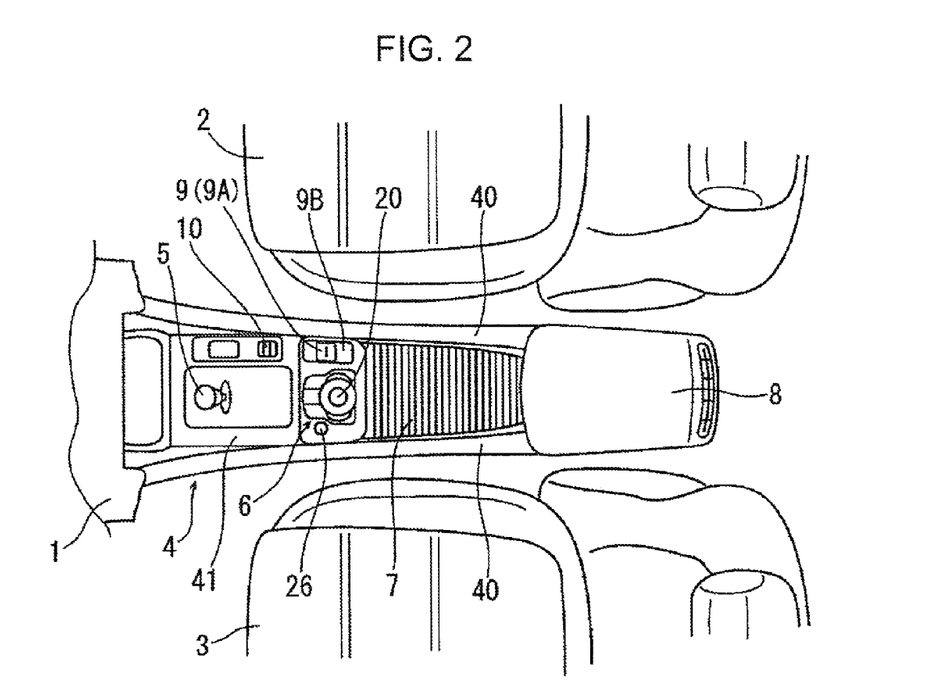
FIG. 2 is a plan view of the center console shown in FIG. 1 and its surroundings.
Figure 3:
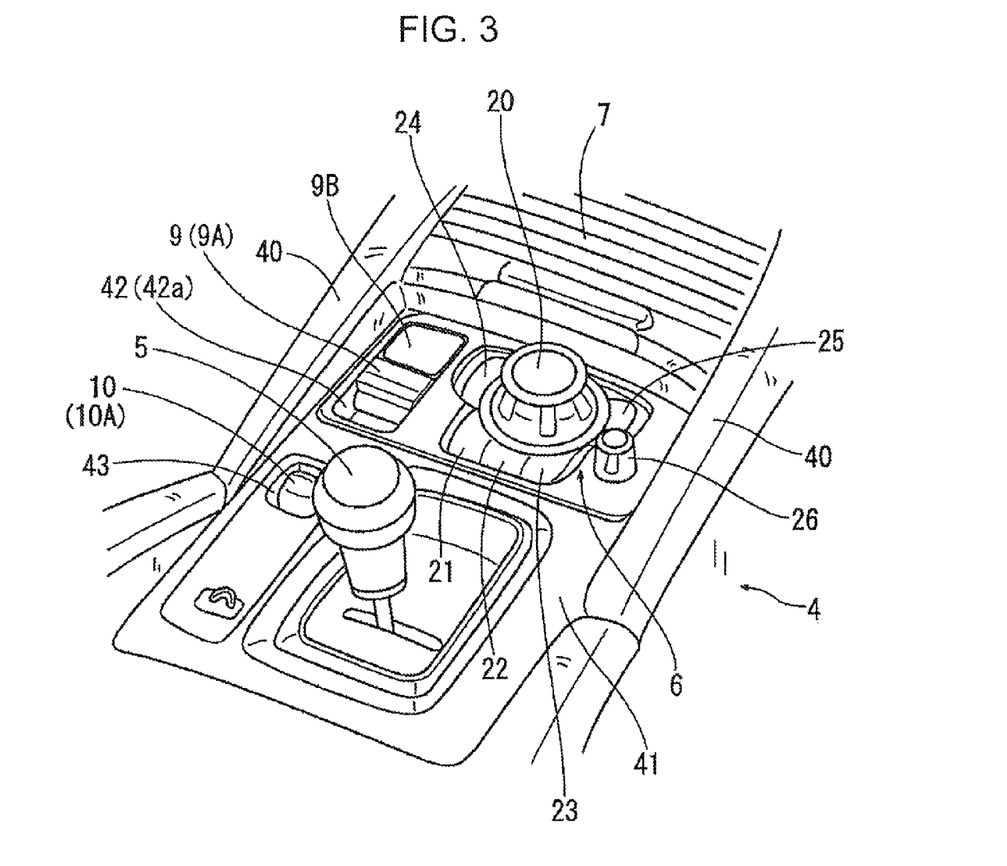
FIG. 3 is a front perspective view showing the details of a dial switch and its surroundings.

In FIG. 1 showing front row seats and its surroundings of a vehicle, the reference numeral 1 denotes an instrument panel (only a part of its middle portion in a vehicle width direction is shown), the reference numeral 2 denotes a driver's seat, and the reference numeral 3 denotes a front passenger's seat. The vehicle shown in FIG. 1 has the steering wheel on the right side.

A center console including a console main body 4 extending in a front-rear direction of the vehicle is provided on a vehicle floor between the driver's seat 2 and the front passenger's seat 3. The front end of the console main body 4 is connected to a widthwise middle portion of the instrument panel 1.

On the top surface of the console main body 4 are disposed an operation knob 5 for operating a transmission, a switch device 6, a lid member 7, and an armrest 8 in the order from front to rear. Further, on the side (right side) of the top surface of the console main body 4 that is closer to the driver's seat 2 are disposed a parking brake switch 9 and a gear change mode switch 10. The parking brake switch 9 is disposed adjacent to the switch device 6 in the vehicle width direction, and the gear change mode switch 10 is disposed adjacent to the operation knob 5 in the vehicle width direction.

The parking brake switch 9 includes a manual operation knob 9A, and an automatic hold operation knob 9B disposed immediately behind the manual operation knob 9A. The manual operation knob 9A is a switch operated by moving up and down a front end thereof with a fingertip. When the manual operation knob 9A is raised (moved up), a command to actuate the parking brake is outputted, and when the manual operation knob 9A is pressed down (moved down), a command to release the parking brake is outputted. The automatic hold operation knob 9B is operable as a push-type on-off switch for activating and deactivating a function of automatically holding the parking brake. Specifically, when the automatic hold operation knob 9B is turned on (the automatic hold function is activated), the parking brake is automatically activated in response to a temporary stop of the vehicle and automatically released in response to pressing down of the accelerator. On the other hand, when the automatic hold operation knob 9B is turned off (the automatic hold function is released), the automatic actuation of the parking brake is not performed.

The gear change mode switch 10 is adapted to give a command to change the gear change characteristic, and includes an operation knob 10A operable to be slid in the front-rear direction by a fingertip of a driver. The gear change mode switch 10 is operated to select one of three gear-change modes including a normal mode, a sport mode, and an economy mode, for example.

Figure 6:
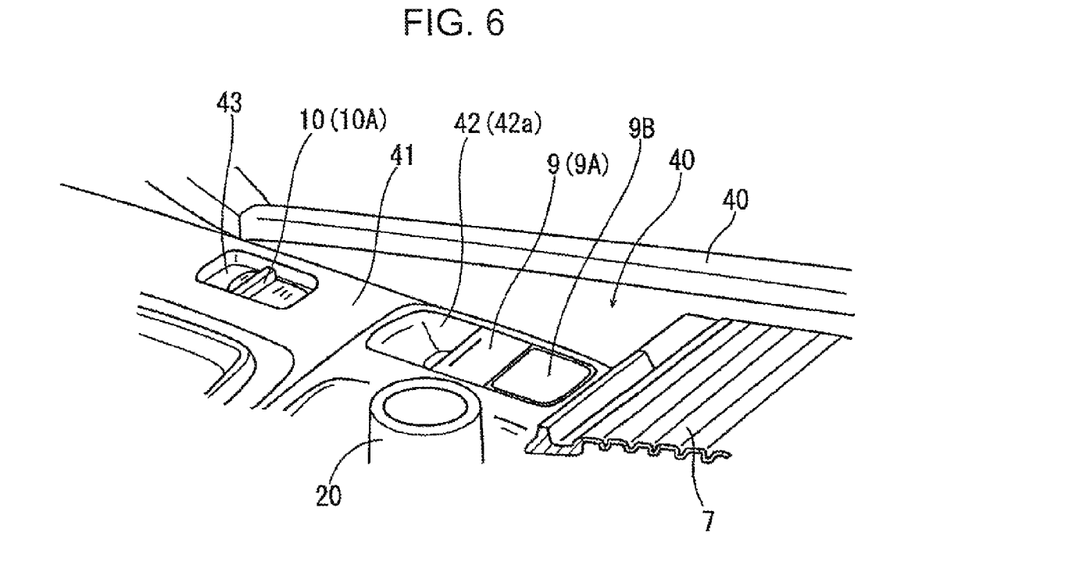
FIG. 6 is a rear perspective view showing an essential part of a parking brake switch and its surroundings.
Figure 7:
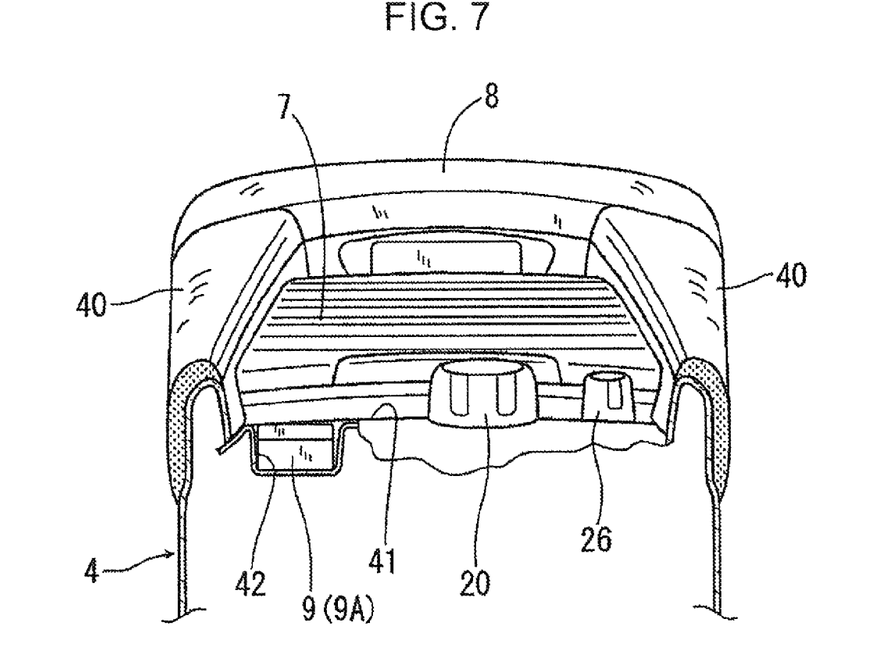
FIG. 7 is a front sectional view of the center console as seen from the front of the dial switch.

The switch device 6 includes the following plurality of switches. In particular, as shown in FIG. 6, the switch device 6 includes a dial switch 20, three push down switches 21, 22, and 23 which are disposed side by side in the vehicle width direction and immediately in front of the dial switch 20, a push down switch 24 disposed immediately on the right side of the dial switch 20, and a push down switch 25 disposed immediately on the left side of the dial switch 20.

The switch device 6 further includes a volume control switch 26 for controlling the volume of an audio device or the like. The volume control switch 26 is disposed in proximity to and on the left side of the push down switches 21 to 23. In other words, the volume control switch 26 is disposed widthwise opposite to the parking brake switch 9 across the dial switch 20.

The dial switch 20 is a substantially cylindrical switch having a projection height of, for example, 2 to 3 cm, and can be operated by three manipulations of rotating, tilting back and forth and from side to side, and pushing down. Further, the dial switch 20 has a relatively large diameter (a diameter equivalent to that of adult's two to four fingers, which is, for example, about 4 to 6 cm) so as to be easily rotated by the three tips of thumb, index, and middle fingers with the palm being placed thereon.

On the other hand, the volume control switch 26 is a substantially cylindrical switch operable to be rotated and has a projection height of, for example, 2 to 3 cm, i.e., a projection height smaller than that of the dial switch 20. Further, the volume control switch 26 has a diameter (e.g. a diameter equivalent to that of an adult's finger, which is, for example, about 1 to 2 cm) that is sufficiently smaller than that of the dial switch 20 so as to be easily rotated by the two tips of thumb and index fingers. The volume control switch 26 is located near but at a small distance (e.g. a length equivalent to or greater than an adult's finger, which is, for example, about 2 to 3 cm) from the dial switch 20 so as to prevent a finger from being caught between the volume control switch 26 and the dial switch 20.

The push down switches 21 to 25 have a height (e.g. a projection height of about 2 to 5 mm) that is sufficiently less than that of each of the dial switch 20 and the volume control switch 26. Further, each of the push down switches 21 to 25 has a relatively large area (e.g. with a width of about 1.5 to 2.0 cm in the vehicle width direction and a length of about 2 to 3 cm in the front-rear direction) so as to be easily pushed down by a fingertip. It should be noted that among the three push down switches 21 to 23 which are disposed directly in front of the dial switch 20, the push down switch 22 in the middle has a width and a projection height greater than those of the left and right push down switches 21 and 23, because the push down switch 22 serves as a home switch that is frequently used as described later. In addition, the push down switch 22 in the middle may be configured to have, for example, a recess or a projection formed in its top surface so as to be clearly distinguished from the left and right push down switches 21 and 23.

Figure 8:
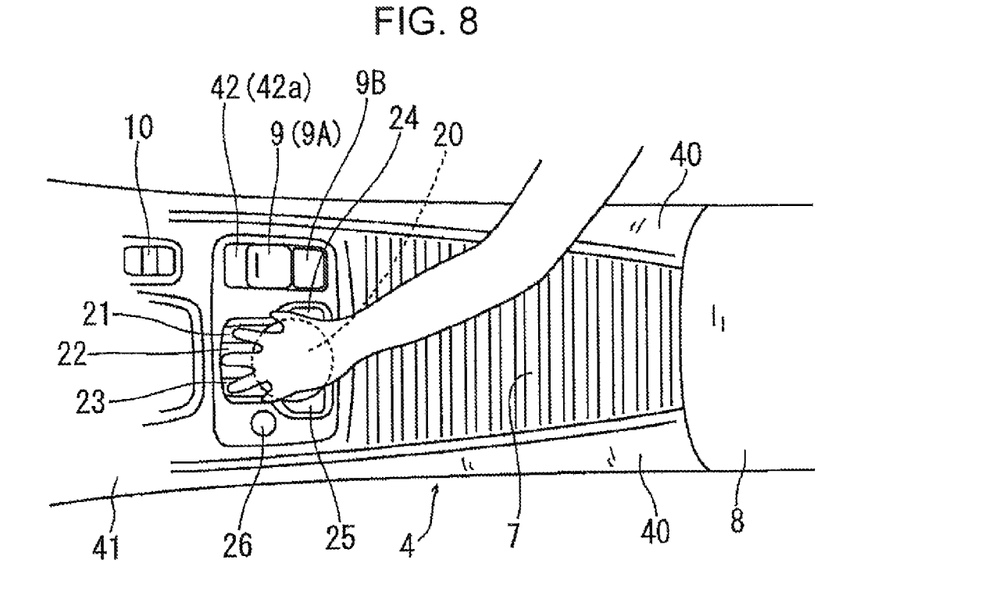
FIG. 8 is a plan view illustrating a driver operating the dial switch.

As shown in FIG. 8, the above-mentioned push down switches 21 to 25 are disposed in such a relationship as to be easily operable by fingers with the palm being placed on the dial switch 20. For example, with a palm being placed on the dial switch 20, it is possible to operate the push down switch 21 by the index finger by bending the index finger slightly downward. In similar manners, it is possible to operate the push down switch 22 by the middle finger, the push down switch 23 by the ring finger, the push down switch 24 by the thumb, and the push down switch 25 by the little finger. In this manner, the five switches 21 to 25, which are operable as push down switches, are provided correspondingly to the positions and the number of fingers. This provides an effect of encouraging the driver to master (learn) operation of each of the push down switches 21 to 25.

In the embodiment, each of the switches 20 to 25 is used to operate a screen of a display (not shown) disposed in the central portion of the instrument panel 1.

Specifically, the dial switch 20 is used to make selection and determination from a plurality of items displayed on the display. For example, the dial switch 20 is tilted back and forth and from side to side or rotated to select a specific item from a plurality of items displayed on the display, and the dial switch 20 is pushed down to display a screen corresponding to the selected item.

Further, the push down switches 21 to 25 are each used as a shortcut key to change a screen of the display instantly to a specific screen that is set in advance. For example, operation of the push down switch 21 causes a navigation screen to be displayed, operation of the push down switch 22 causes a home screen to be displayed, operation of the push down switch 23 causes an audio screen to be displayed, operation of the push down switch 24 causes a screen to be replaced by the preceding screen, and operation of the push down switch 25 causes a favorite screen that is set in advance to be displayed.

Figure 4:
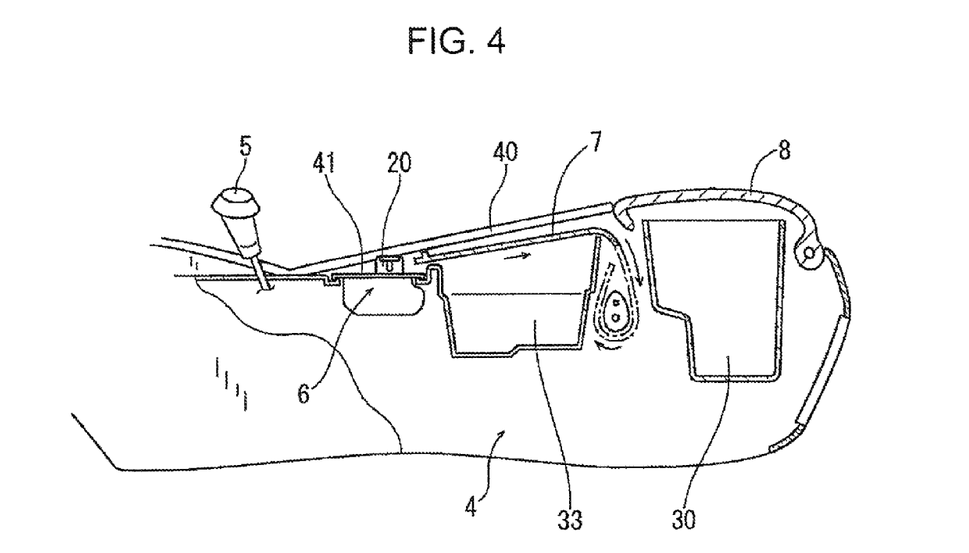
FIG. 4 is a sectional side view of the dial switch and its surroundings of the center console.
Figure 5:
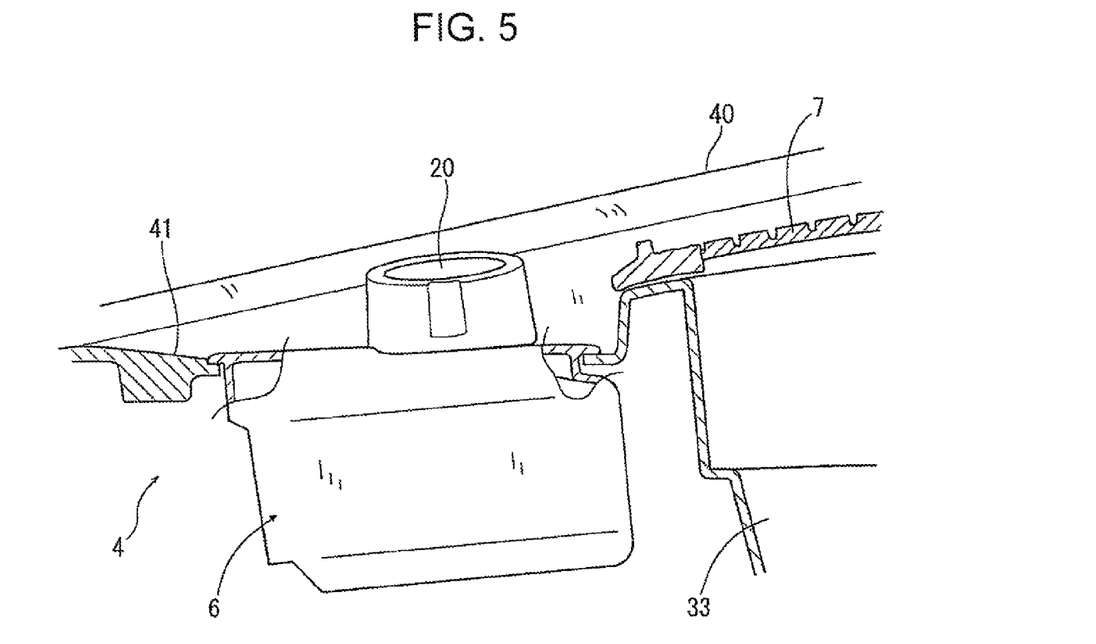
FIG. 5 is an enlarged sectional side view of the dial switch shown in FIG. 4 and its surroundings.

The armrest 8 is disposed on the top surface of a rear end of the console main body 4. A container 30 opening upward is disposed under the armrest 8 (see FIG. 4). The armrest 8 is pivotally supported over the container 30. In other words, the armrest 8 not only functions as an armrest for allowing an arm (elbow) of an occupant to be placed thereon, but also functions as a lid member for opening and closing the container 30. The armrest 8 according to the embodiment is of a front open type which is pivotable at the rear end thereof. Alternatively, it may be configured to be of a side open type which is pivotable at the left end or the right end thereof.

Figure 9:
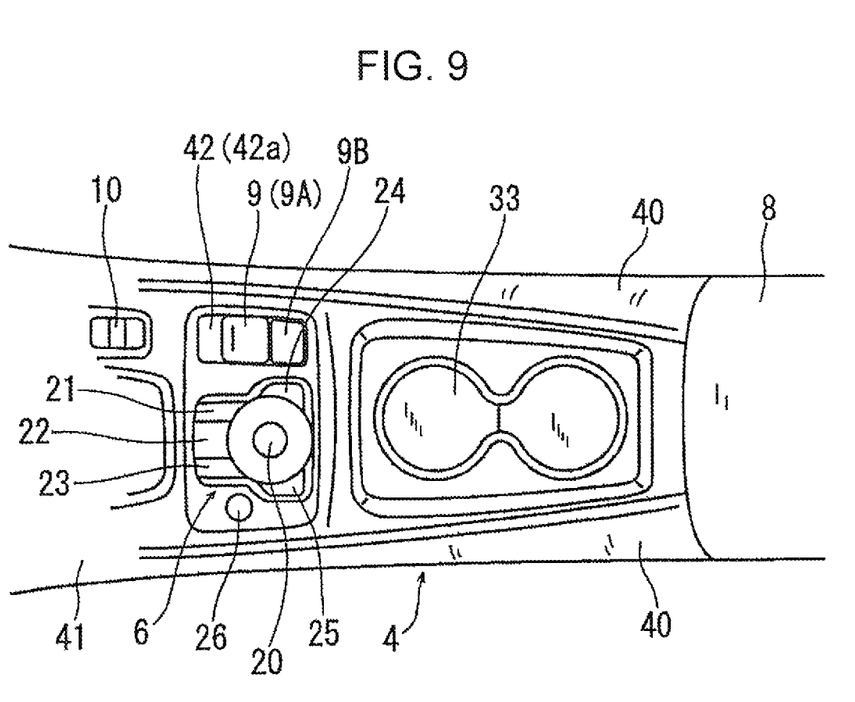
FIG. 9 is a plan view showing a cup holder with a lid member opened.

In an upper portion of the console main body 4, a cup holder 33 (see FIGS. 4 and 9) opening upward is formed between the switch device 6 and the armrest 8. A lid member 7 is provided on the top surface of the cup holder 33 for opening and closing the cup holder 33. The lid member 7 is, in the embodiment, configured by a flexible member having a multi bending form, and supported slidably in the front-rear direction. Specifically, the lid member 7 can be slid rearwardly from a closed position (FIG. 8) covering the entire top of the cup holder 33 to an open position (FIG. 9) exposing a large part of the top of the cup holder 33, for example. For example, when a front end of the lid member 7 in the closed position is held and pushed rearwardly to slide the lid member 7 rearwardly, the lid member 7 is wound into the console main body 4 (the lid member 7 being wound is shown by the chain line in FIG. 4) to expose the top of the cup holder 33 (see FIG. 9).

Pads 40, which are made of an elastic material, are respectively attached to top surfaces of left and right side edges of the console main body 4 so that it extends in the front-rear direction. Each of left and right pads 40 is so disposed that the front end thereof is located near the operation knob 5 and the rear end thereof is formed to continue to the armrest 8. Further, each of the pas 40 has, in plan view, a width gradually increasing from front to rear. Specifically, the outer edge of each of the pads 40 extends substantially in a straight line in the front-rear direction along the widthwise outer surface of the console main body 4, whereas the inner edge of each of the pads 40 is inclined gradually widthwise inwardly toward the rear end thereof. In other words, the widthwise gap between the pair of pads 40 gradually narrows toward rear (gradually widens toward front).

The top surface of the rear end of each of the pads 40 is substantially flush with the top surface of the front end of the armrest 8. In other words, the top surface of the rear end of the pad 40 is adjacent to the top surface of the front end of the armrest 8 in the front-rear direction, and is at the same height level. As described, the pair of pads 40 are so formed that the gap therebetween narrows only at their rear parts (widens at their front parts). This allows a sufficient installation space to be secured for the operation knob 5, the various switches 6, 9, and 10, the cup holder 33, and the like.

Now, the vertical positional relationship among the components in side view will be described with focus on the pair of left and right pads 40. First, the top surface of the pad 40 gradually lowers toward the front end thereof and reaches a lowest level at the vicinity of the operation knob 5. A recessed surface 41 having a height lower than the top surfaces of the pads 40 is formed on the top surface of the console main body 4 and in front of the cup holder 33, more specifically, within a range from the front end of the lid member 7 in the state of covering the cup holder 33 to the vicinity of the operation knob 5. In other words, in front of the cup holder 33, a recess is defined by the pair of pads 40 and the recessed surface 41 located therebetween. The above-mentioned operation knob 5, switch device 6, parking brake switch 9, and gear change mode switch 10 are disposed on the recessed surface 41.

The dial switch 20 and the volume control switch 26 are lower than the top surfaces of the pads 40 (see FIGS. 4 to 7). Further, the lid member 7 in the state of covering the cup holder 33 extends along the top surfaces of the pads 40 and has a top surface higher than the recessed surface 41. In other words, the lid member 7 in the closed position is disposed behind and at a higher level than the recessed surface 41. On the other hand, the top surface of the lid member 7 in the closed position is lower than the top surfaces of the pads 40.

As described, in the embodiment, the recessed surface 41, the lid member 7, and the pads 40 are relatively so positioned that the recessed surface 41 is at the lowest level, the top surface of the lid member 7 in the closed position is higher than the recessed surface 41, and the top surfaces of the pads 40 (and the top surface of the armrest 8) are higher than the top surface of the lid member 7 in the closed position.

The top surface of the dial switch 20 is substantially at the same height level as the top surface of the front end of the lid member 7 in the closed position. It is possible to place, on the top surface of the front end of the lid member 7 located at such position, a wrist or the vicinity thereof when operating the dial switch 20 or the like. In other words, the front end of the lid member 7 in the closed position can be utilized as a palm rest, and referred to as the "elevated portion" in the claims.

The recessed surface 41 is formed with a depressed portion 42, in which the parking brake switch 9 is disposed. In other words, a specific part of the recessed surface 41 is recessed further downward to define the depressed portion 42, and the above-mentioned manual operation knob 9A and automatic hold operation knob 9B are accommodated in the depressed portion 42. In front of the manual operation knob 9A, a concave 42a for allowing a fingertip of a driver to enter therein is defined by the presence of the depressed portion 42. The insertion of the fingertip to the concave 42a makes it possible to easily move the manual operation knob 9A up and down. The manual operation knob 9a is so provided as not to project upward from the recessed surface 41 in order to prevent misoperation thereof. Similarly, the automatic hold knob 9B is so provided as not to project upward from the recessed surface 41.

The recessed surface 41 is formed with another depressed portion 43 which is located in front of the depressed portion 42. The gear change mode switch 10 is disposed in the another depressed portion 43. The operation knob 10A of the switch 10 is slidable in the front-rear direction in the depressed portion 43. The operation knob 10A is also so provided as not to project upward from the recessed surface 41 in order to prevent misoperation thereof.

Here, FIG. 8 illustrates a driver seated on the driver's seat 2 and operating the dial switch 20. As shown in FIG. 8, in the embodiment, the driver can operate the dial switch 20 in a comfortable position with his/her wrist being placed on the top surface of a front end of the lid member 7 in the closed position and his/her arm being placed on a rear end of the pad 40. In other words, the driver can utilize the front end of the lid member 7 as a palm rest and can utilize the rear end of the pad 40 as an arm rest, when operating the dial switch 20. Furthermore, the driver can easily operate each of the push down switches 21 to 25 and the volume control switch 26 in the same position. Further, an occupant seated on the front passenger's seat 3 can also easily operate the dial switch 20 or the like in a position bilaterally symmetrical to that shown in FIG. 8.

Further, in the embodiment, the parking brake switch 9 is disposed in closer proximity to the driver's seat 2 than the dial switch 20, which allows the driver to easily operate the parking brake switch 9. In particular, the height of the pad 40 gradually decreases toward the front end of the pad 40, which allows the driver to operate the parking brake switch 9 without obstruction by the pad 40. Further, even when the front-seat passenger (occupant in the front passenger's seat 3) operates the dial switch 20 while the driver is operating the parking brake switch 9, their arms are prevented from crossing each other. This allows the driver and the front-seat passenger to easily operate the switch 9 and the dial switch 20, respectively.

Further, in the embodiment, not only the parking switch 9 and the gear change mode switch 10, but also the dial switch 20 and the volume control switch 26 are so provided as not to project upward from the pads 40. This allows an overall neat design, and prevents the dial switch 20 or the like from being accidentally touched across the pad 40.

Although the embodiment has been described, the present invention is not limited to the above-described embodiment, and various changes may be appropriately made without departing from the scope of the claimed subject matter.

For example, the dial switch 20 may be configured as any type of switch adapted to operate a vehicle-mounted electronic device such as a switch for operating an air conditioner, and therefore can be used for any appropriate purpose. Further, the armrest 8 is not limited to serve as a lid of the container 30. Any member other than the container 30 may be provided under the armrest 8. Further, the lid member 7 on the top of the cup holder 33 may be omitted and the elevated portion (palm rest) may be defined by the front wall of the cup holder 33 that is constantly open upward. Further, any member other than the cup holder 33 may be provided between the dial switch 20 and the armrest 8.

The push down switches 21 to 25 and the volume control switch 26 that are disposed on the recessed surface 41 may be omitted. Further, at least one or both of the parking brake switch 9 and the gear change mode switch 10 may be omitted. The pad 40 is not limited to be made of an elastic material, and may be made of any appropriate material such as hard synthetic resin (may be made either of a soft or hard material).

The present invention is not limited to the above-described object, but also implicitly includes other objects of providing practically preferable or advantageous configurations.

Finally, the characteristic features and the advantageous effects thereof disclosed in the above-described embodiment will be summarized.

A center console structure of a vehicle according to the above-described embodiment comprises: a console main body disposed in a vehicle interior and extending in a front-rear direction of the vehicle; an armrest disposed on a rear end of the console main body; a dial switch adapted to operate a vehicle-mounted electronic device and disposed on a top surface of the console main body at a position in front of the armrest; a pair of left and right pads disposed in front of the armrest and extending in the front-rear direction along opposite side edges of the console main body. Each of the pads has, in plan view, a width increasing from front to rear inwardly of the console main body, and a top surface of a rear end of each of the pads is substantially flush with a top surface of a front end of the armrest. A recessed surface is formed on a top surface of the console main body between the pair of left and right pads, wherein the recessed surface has a height lower than respective top surfaces of the pads, and the dial switch is disposed on the recessed surface to project upward. An elevated portion is formed behind the dial switch and in front of the armrest, wherein the elevated portion has a top surface higher than the recessed surface and lower than the pads, and is usable as a palm rest.

According to this configuration, each of the pair of left and right pads extending in the front-rear direction is wider in its rear part than in its front part and substantially flush with the armrest. This allows the rear part of each of the pads to substantially function as an extension (a part of the armrest) extending forward from the armrest. This makes it possible, when operating the dial switch, to easily operate the dial switch in a comfortable position with occupant's arm being placed on the rear part of the pad (i.e. while utilizing the rear part of the pad as an armrest). Furthermore, the pads have a longer dimension in the front-rear direction, which allows the occupant's arm to be placed on the top surface of the pad irrespective of his/her physique. Therefore, there is no need to provide a special movable mechanism that is operable to, for example, move the armrest in the front-rear direction and, therefore, it is possible to overcome variation in physiques of occupants appropriately with the simple configuration.

Further, the dial switch is provided on the recessed surface that is located at a relatively low level, and the elevated portion having a height higher than the recessed surface and lower than the pads is formed between the dial switch and the armrest. This makes it possible, when operating the dial switch, to easily operate the dial switch in a comfortable position with occupant's arm being placed on the elevated portion (i.e. while utilizing the elevated portion as a palm rest).

As we can see, according to the above-described configuration, it is possible to realize a component that functions as an armrest irrespective of variation in physiques of occupants without using any movable mechanism, and to improve the operability of the dial switch. Further, because the pair of left and right pads are so configured that the widthwise gap therebetween increases in its rear region, it is possible to secure a sufficient installation space for the dial switch and the like.

In addition, because the pair of left and right pads extending in the front-rear direction is formed to continue to the armrest, it is possible to provide the top surfaces of the left and right edges of the console main body, which is likely to stand out in the console main body, with a neat design continuous to the armrest, and thereby improve an external appearance of the center console.

In the above-described center console structure, the top surface of the dial switch is preferably lower than the top surfaces of the pads.

According to this configuration, the dial switch is, in side view, not projecting upward from the pads. This allows a neat design that has little irregularities and, therefore, an improved external appearance to be obtained. Further, it is possible, when an occupant moves his/her hand toward the dial switch from the side of the pad for a purpose other than operating the dial switch, to prevent the fingers from accidentally touching the dial switch.

In the above-described configuration, the top surface of the dial switch is preferably substantially at the same height level as the top surface of the elevated portion.

In this case, it is possible to easily operate the dial switch in a comfortable position with occupant's wrist being placed on the elevated portion and, therefore, to improve the operability of the dial switch.

In the above-described center console structure, it is preferred that each of the pads gradually lowers toward a front end thereof, and that a parking brake switch is disposed on the recessed surface, wherein a concave for allowing a fingertip to enter therein to operate the parking brake switch is formed in front of the parking brake switch, and wherein the concave is located in front of the dial switch.

According to this configuration, it is possible to allow an occupant, when approaching the parking brake switch, to move his/her fingers to the parking brake switch easily over a front part of the pad that is at a low level. Further, the occupant can, when operating the parking brake switch, insert his/her finger to the concave and easily hook the finger on the parking brake switch. In this manner, it is possible to improve the accessibility to and the operability of the parking brake switch simultaneously.

In the above-described configuration, the dial switch is preferably located in closer proximity to a front passenger's seat in a vehicle width direction than the parking brake switch.

According to this configuration, when a driver operates the parking brake switch while a front-seat passenger is operating the dial switch, their arms are prevented from crossing each other. Therefore, the operability of both switches can be secured simultaneously.

In the above-described center console structure, it is preferred that a cup holder opening upward is disposed behind the recessed surface, and the elevated portion is defined by one of a front wall of the cup holder and a front end of a lid member covering the cup holder.

According to this configuration, it is possible to obtain a palm rest function by utilizing the cup holder without providing an additional special member that is dedicated to serve as a palm rest. Further, it is possible to improve the operability of the dial switch with a compact configuration, as compared with the case where a palm rest and a cup holder are formed independently of each other.

INDUSTRIAL APPLICABILITY

As described, the present invention can provide a preferable structure of a center console in a vehicle, that includes a dial switch disposed on a top surface of a console main body.

The invention claimed is:

1. A center console structure of a vehicle, comprising:
a console main body disposed in a vehicle interior and extending in a front-rear direction of the vehicle;
an armrest disposed on a rear end of the console main body;
a dial switch configured to operate a vehicle-mounted electronic device and disposed on a top surface of the console main body at a position in front of the armrest;
a pair of left and right pads disposed in front of the armrest and extending in the front-rear direction along opposite side edges of the console main body, each of the pads having, in plan view, a width increasing from front to rear inwardly of the console main body, and a top surface of a rear end of each of the pads being substantially flush with a top surface of a front end of the armrest;
a recessed surface formed on a top surface of the console main body between the pair of left and right pads, the recessed surface having a height lower than respective top surfaces of the pads, and the dial switch being disposed on the recessed surface to project upward;
an elevated portion located behind the dial switch and in front of the armrest, the elevated portion having a top surface higher than the recessed surface and lower than the pads, and being usable as a palm rest; and
a container opening upward and disposed under the armrest, the armrest functioning as a lid member for opening and closing the container, wherein
the pair of pads are disposed in such a manner that a widthwise gap therebetween gradually narrows toward rear while maintaining a positional relationship in which the pair of pads are separated from each other in a vehicle width direction.

2. A center console structure of a vehicle according to claim 1, wherein
a top surface of the dial switch is lower than the top surfaces of the pads.

3. A center console structure of a vehicle according to claim 2, wherein
the top surface of the dial switch is substantially at the same height level as the top surface of the elevated portion.

4. A center console structure of a vehicle according to claim 3, wherein:
each of the pads gradually lowers toward a front end thereof;
on the recessed surface is disposed a parking brake switch; and
in front of the parking brake switch is formed a concave for allowing a fingertip to enter therein to operate the parking brake switch, the concave being located in front of the dial switch.

5. A center console structure of a vehicle according to claim 4, wherein
the dial switch is located in closer proximity to a front passenger's seat in a vehicle width direction than the parking brake switch.

6. A center console structure of a vehicle according to claim 5, wherein
behind the recessed surface is disposed a cup holder opening upward, and
the elevated portion is defined by one of a front wall of the cup holder and a front end of a lid member covering the cup holder.

7. A center console structure of a vehicle according to claim 2, wherein:
each of the pads gradually lowers toward a front end thereof;
on the recessed surface is disposed a parking brake switch; and
in front of the parking brake switch is formed a concave for allowing a fingertip to enter therein to operate the parking brake switch, the concave being located in front of the dial switch.

8. A center console structure of a vehicle according to claim 7, wherein
the dial switch is located in closer proximity to a front passenger's seat in a vehicle width direction than the parking brake switch.

9. A center console structure of a vehicle according to claim 8, wherein
behind the recessed surface is disposed a cup holder opening upward, and
the elevated portion is defined by one of a front wall of the cup holder and a front end of a lid member covering the cup holder.

10. A center console structure of a vehicle according to claim 7, wherein
behind the recessed surface is disposed a cup holder opening upward, and
the elevated portion is defined by one of a front wall of the cup holder and a front end of a lid member covering the cup holder.

11. A center console structure of a vehicle according to claim 1, wherein:
each of the pads gradually lowers toward a front end thereof;
on the recessed surface is disposed a parking brake switch; and
in front of the parking brake switch is formed a concave for allowing a fingertip to enter therein to operate the parking brake switch, the concave being located in front of the dial switch.

12. A center console structure of a vehicle according to claim 11, wherein
the dial switch is located in closer proximity to a front passenger's seat in a vehicle width direction than the parking brake switch.

13. A center console structure of a vehicle according to claim 12, wherein
behind the recessed surface is disposed a cup holder opening upward, and
the elevated portion is defined by one of a front wall of the cup holder and a front end of a lid member covering the cup holder.

14. A center console structure of a vehicle according to claim 11, wherein
behind the recessed surface is disposed a cup holder opening upward, and
the elevated portion is defined by one of a front wall of the cup holder and a front end of a lid member covering the cup holder.

15. A center console structure of a vehicle according to claim 4, wherein
behind the recessed surface is disposed a cup holder opening upward, and
the elevated portion is defined by one of a front wall of the cup holder and a front end of a lid member covering the cup holder.

16. A center console structure of a vehicle according to claim 3, wherein
behind the recessed surface is disposed a cup holder opening upward, and
the elevated portion is defined by one of a front wall of the cup holder and a front end of a lid member covering the cup holder.

17. A center console structure of a vehicle according to claim 2, wherein
behind the recessed surface is disposed a cup holder opening upward, and
the elevated portion is defined by one of a front wall of the cup holder and a front end of a lid member covering the cup holder.

18. A center console structure of a vehicle according to claim 1, wherein
behind the recessed surface is disposed a cup holder opening upward, and
the elevated portion is defined by one of a front wall of the cup holder and a front end of a lid member covering the cup holder.

19. A center console structure of a vehicle, comprising:
a console main body disposed in a vehicle interior and extending in a front-rear direction of the vehicle;
an armrest disposed on a rear end of the console main body;
a dial switch configured to operate a vehicle-mounted electronic device and disposed on a top surface of the console main body at a position in front of the armrest;
a pair of left and right pads disposed in front of the armrest and extending in the front-rear direction along opposite side edges of the console main body, each of the pads having, in plan view, a width increasing from front to rear inwardly of the console main body, and a top surface of a rear end of each of the pads being substantially flush with a top surface of a front end of the armrest;
a recessed surface formed on a top surface of the console main body between the pair of left and right pads, the recessed surface having a height lower than respective top surfaces of the pads, and the dial switch being disposed on the recessed surface to project upward; and
an elevated portion located behind the dial switch and in front of the armrest, the elevated portion having a top surface higher than the recessed surface and lower than the pads, and being usable as a palm rest, wherein
each of the pads gradually lowers toward a front end thereof;
on the recessed surface is disposed a parking brake switch; and
in front of the parking brake switch is formed a concave for allowing a fingertip to enter therein to operate the parking brake switch, the concave being located in front of the dial switch.

20. A center console structure of a vehicle, comprising:
a console main body disposed in a vehicle interior and extending in a front-rear direction of the vehicle;
an armrest disposed on a rear end of the console main body;
a dial switch configured to operate a vehicle-mounted electronic device and disposed on a top surface of the console main body at a position in front of the armrest;
a pair of left and right pads disposed in front of the armrest and extending in the front-rear direction along opposite side edges of the console main body, each of the pads having, in plan view, a width increasing from front to rear inwardly of the console main body, and a top surface of a rear end of each of the pads being substantially flush with a top surface of a front end of the armrest;

a recessed surface formed on a top surface of the console main body between the pair of left and right pads, the recessed surface having a height lower than respective top surfaces of the pads, and the dial switch being disposed on the recessed surface to project upward; and an elevated portion located behind the dial switch and in front of the armrest, the elevated portion having a top surface higher than the recessed surface and lower than the pads, and being usable as a palm rest, wherein behind the recessed surface is disposed a cup holder opening upward, and the elevated portion is defined by one of a front wall of the cup holder and a front end of a lid member covering the cup holder.

* * * * *